Dec. 23, 1941.   R. R. TWAY   2,266,924
ROAD ROLLER
Filed Dec. 6, 1940   3 Sheets-Sheet 1

Robert R. Tway
INVENTOR

BY Bernard P. Miller
ATTORNEY

Dec. 23, 1941.  R. R. TWAY  2,266,924
ROAD ROLLER
Filed Dec. 6, 1940  3 Sheets-Sheet 2

Robert R. Tway
INVENTOR

BY Bernard P. Miller
ATTORNEY

Dec. 23, 1941.  R. R. TWAY  2,266,924
ROAD ROLLER
Filed Dec. 6, 1940  3 Sheets-Sheet 3

Robert R. Tway
INVENTOR
BY
Bernard P. Miller
ATTORNEY

Patented Dec. 23, 1941

2,266,924

UNITED STATES PATENT OFFICE 2,266,924

ROAD ROLLER

Robert R. Tway, Oklahoma City, Okla.

Application December 6, 1940, Serial No. 368,871

7 Claims. (Cl. 94—50)

My invention relates to road rolling apparatus, and more particularly to apparatus for compressing oil mixed roads and road sub-grades.

Road rollers, of the vehicle type, are now being used wherein a body or frame is provided at both its front and rear ends with a set of multiple pneumatic tired wheels. The wheels of each set are usually mounted upon a single axle and are spaced slightly from each other along the axle. It is common practice to space the wheels of the different sets so that the rear wheels are aligned with the spaces between the front wheels. This arrangement causes substantially the entire road surface, over which the vehicle passes, to be contacted by the tires on the wheels.

That type of roller has proved entirely satisfactory, so far as properly compressing the road surface is concerned, but when one of the inside tires of a set is worn out or is punctured, it is necessary to disconnect the axle from the frame, and to remove some of the outside wheels from the axle, in order to remove the one wheel needing repairs.

It is the prime object of the present invention to provide a multiple wheel assembly, in which the wheels are laterally aligned with each other and are laterally spaced in relation to the vehicle frame, but in which provision is made for the individual removal of each and every wheel without disturbing any other wheel of the assembly.

Another object is to provide a wheel assembly of this type in which the desired wheel may be easily and quickly removed and replaced.

A further object is to accomplish the above objects without a prohibitive manufacturing cost.

A still further object is to provide a new and novel axle mounting mechanism for vehicle wheels.

Other objects will be apparent from the following description when taken in connection with the accompanying three-sheet drawings, wherein.

Like characters of reference designate like parts in all of the figures.

In the drawings.

Figure 1:
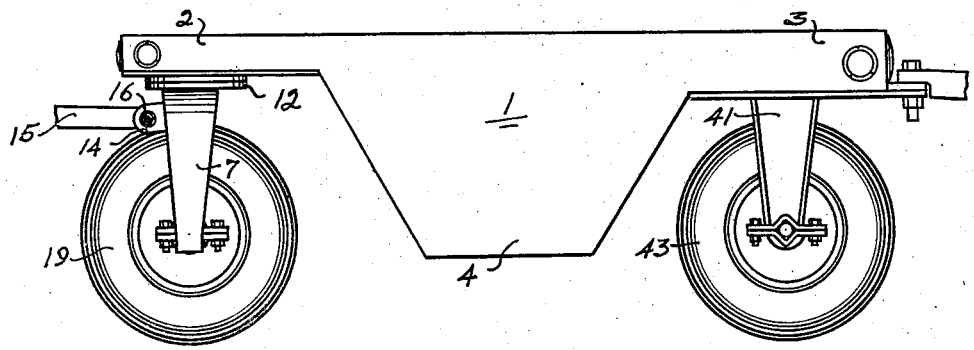
Figure 1 is a side elevational view of a preferred type of the roller.

The reference numeral 1 indicates as a whole a vehicle frame or body having a front end portion 2, and a rear end portion 3. Intermediate the portions 2 and 3 is provided a bin 4 adapted to receive some heavy weighted commodity such as steel filings or scrap metal.

Beneath the front end portion 2 is provided a heavy yoke 5 having outside depending arms 6 and 7, and having therebetween a suitable plurality of spaced depending legs 8, 9 and 10. The yoke, its arms, and its legs are all constructed of heavy metal beams integrally assembled, and the yoke is pivotally connected to the body portion 2 by a usual king-bolt 11. A usual fifth-wheel mechanism 12 is provided around the king-bolt between yoke 5 and body for an obvious purpose. The arms 6 and 7 are each provided with a pair of forwardly projecting laterally perforated ears 14 whereby a tongue 15 may be attached to the yoke by bolts 16.

The lower ends of the arms 6 and 7, and the intermediate legs 8, 9 and 10, are all formed with laterally projecting flanges 51, and each also has a transverse groove 17 (Figure 6), for a purpose more fully described hereinbelow.

In carrying out the present invention, a plurality of pneumatic tired wheels 19 are individually mounted beneath the yoke 5, one each between the arm 6 and leg 8, between the legs 8 and 9, between the legs 9 and 10, and between the leg 10 and arm 7. In order to individually mount these wheels rotatively, each wheel is provided with an individual short axle 18, the length of which is slightly less than the distance from center to center of the arm and leg, or leg and leg, between which the wheel is mounted.

Figure 5:
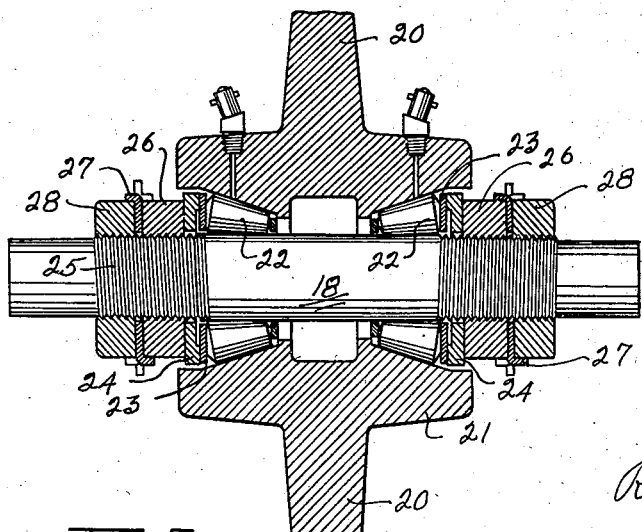
Figure 5 is a typical fragmentary vertical sectional view taken through one of the wheels.

A typical axle and wheel assembly is illustrated in Figure 5 wherein the reference numeral 20 indicates a usual wheel web having a usual central hub 21 which is laterally bored to receive a pair of suitable anti-friction bearings 22 through which the axle 18 extends. At the outside end of each bearing 22 is a sealing gasket 23 and a thrust washer 24. The axle 18 is threaded at each end as shown at 25 to receive a retaining nut 26, and a lock-washer 27 and lock-nut 28 is also provided to insure against displacement of the nut 26. The washer and nut assembly at both ends of the axle 18 are identical.

Figure 4:
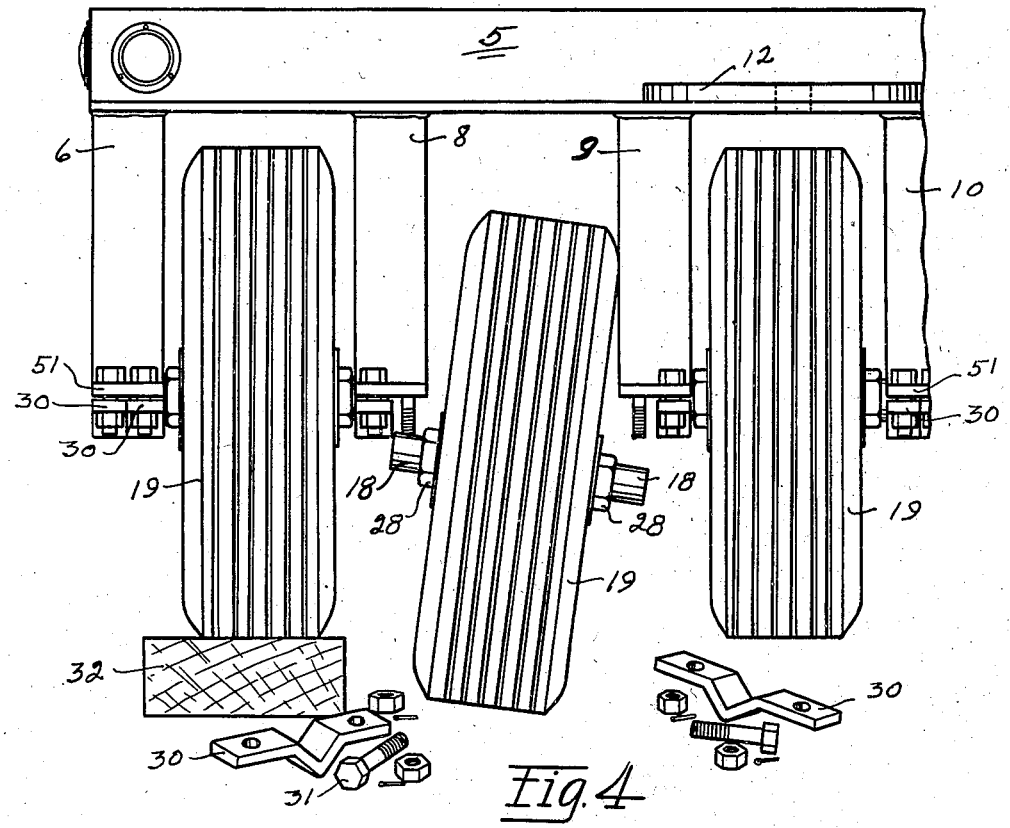
Figure 4 is a fragmentary rear end elevation, illustrating the manner in which an inside wheel may be individually removed from its assembly.
Figure 6:
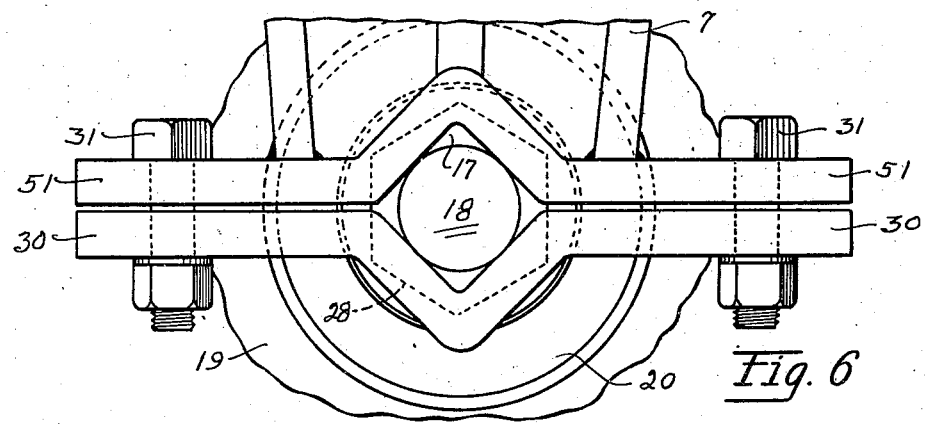
Figure 6 is a fragmentary side elevational view of the lower end of one of the wheel supporting arms of the vehicle.

In mounting the axles 18 beneath the lower ends of the adjacent arm and leg, or leg and leg, as the case may be, each end of the axle 18 is placed within a portion of one of the previously mentioned transverse grooves 17, and a similarly grooved plate 30 is bolted to the bottom of the leg or arm by bolts 31, as best shown in Figures 4 and 6. As clearly shown in Figure 4, the plates 30 are only about one-half the width of the lower ends of the arms and legs, and consequently the removal of two adjacent plates 30 will release any desired one of the axles 18.

It will be understood, of course, that when the wheels 19 are in assembled positions, the axles 18 are all in axial alignment with each other.

As best illustrated in Figure 4, the present wheel assembly eliminates the necessity of using a usual vehicle jack in order to remove or replace any one wheel of the assembly. All that is necessary is to run one wheel of the assembly upon a block 32 as shown. One end of the wheel assembly will thus be raised sufficiently to permit removal of the next adjacent wheel, and as previously stated herein this is accomplished by merely removing the bolts 31 and dropping down the two proper plates 30.

Beneath the rear end portion 3 of the body 1, there is provided a rigid transverse beam 40 having a plurality of spaced depending legs 41 similar in construction to the legs of the front wheel assembly, as above described. Wheels 43, similar to the front wheels 19 are mounted in a similar manner between the legs 41.

Figure 2:
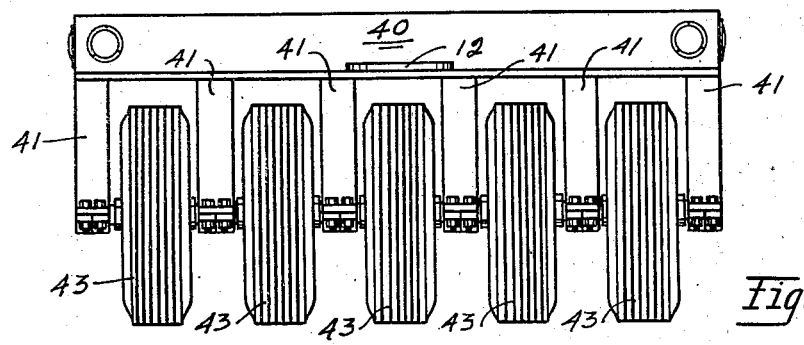
Figure 2 is a rear end elevational view of the roller, taken substantially from the right hand end of the vehicle as depicted in Figure 1.
Figure 3:
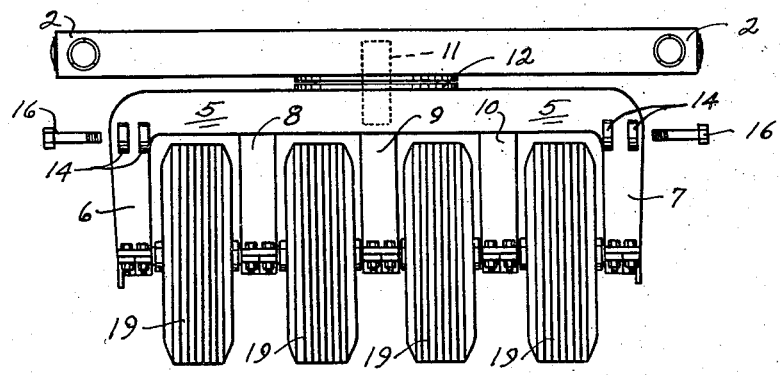
Figure 3 is a front end elevational view.

As may be clearly seen in comparing Figures 1 and 2, the front wheels 19 are so spaced in relation to the rear wheels 43, that the wheels 19 are aligned with the spaces between the wheels 43. This arrangement insures complete wheel coverage of the road surface over which the vehicle is drawn. A plurality of the vehicles may be used one behind the other when desired.

Figure 7:
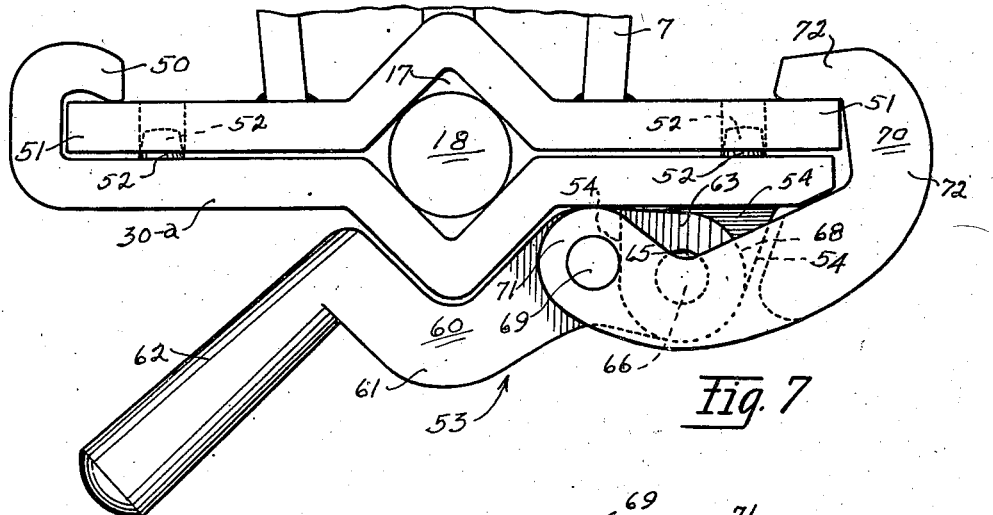
Figure 7 is a view similar to Figure 6, but showing an alternative means for fastening one end of a wheel axle to the lower end of the arm; and, Figure 8 is a bottom view of Figure 7.
Figure 8:
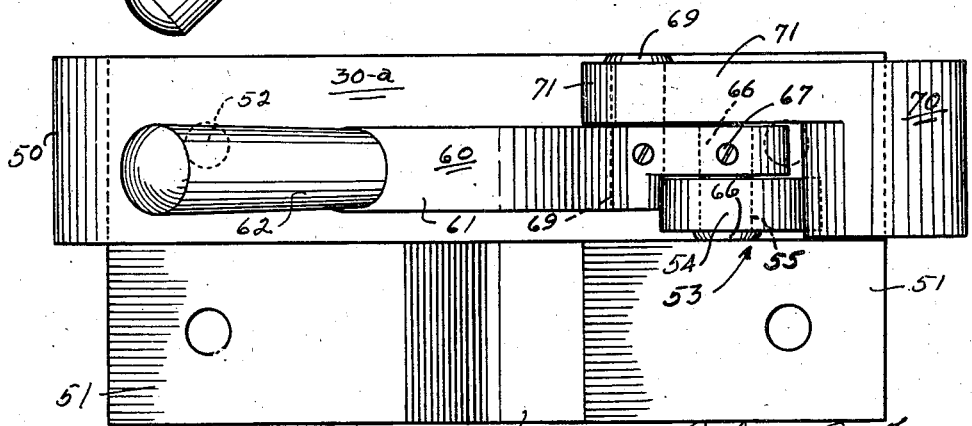

In Figures 7 and 8 is illustrated a means, other than the bolts 31 and plates 30, for holding the axles 18 in rigid position beneath the legs or arms, as the case may be. In this embodiment, the plate 30 is supplanted by a somewhat similar plate 30—a which differs from the plate 30 by having at one end a hook 50 adapted to engage over the upper surface of the lower flange 51 forming a part of each arm or leg. The upper surface of the plate 30—a has two upstanding studs 52 adapted to register with bolt holes in the flanges 51 when the plate is in proper position to retain the axle 18.

The end of the plate 30—a which lies opposite to the hooked end 50, is adapted to be held in contiguous relation to the adjacent flange 51 by a lever operated clamping mechanism indicated as a whole by the reference numeral 53. In order to accommodate the clamping mechanism 53, the lower surface of the plate 30—a is provided with a depending boss 54 having a transverse perforation 55 therethrough.

The clamping mechanism 53 consists substantially of a lever arm 60 having a substantially V-shaped central portion 61 adapted to extend along the nether surface of the plate 30—a and conform to exterior configuration thereof. The lever arm is provided at one end with a downwardly extending handle 62, and its other end portion 63 is provided with a transverse perforation 65 adapted to receive a pivot pin 66 which extends through the perforation 55 in the boss 54. A set-screw 67 acts to prevent displacement of the pin 66 in an obvious manner.

The end portion 63 of the lever arm 60 is also provided with an arcuate cam surface 68 having a rolling contact with the bottom of the plate 30—a when the lever arm 60 is moved toward and away from the plate, with the pivot pin 66 acting as a pivotal axis for such movement.

At a point located a short distance from the pivot-pin 66, and toward the handle 62, the end portion 63 of the lever arm 60 is transversely perforated to receive a second pivot-pin 69. The pivot pin 69 acts as a means for pivotally connecting the shank end 71 of a clamping jaw member 70 to the lever arm 60.

As best illustrated in Figure 7, the jaw member 70 is provided with a hook portion 72 at its free end which is adapted to extend upwardly past the ends of the plate 30—a and the flange 51 of the arm 7, and to hook over the upper surface of the flange 51.

Operation of the clamping mechanism 53 is substantially as follows:

With the jaw 70 and lever arm 60 in their installed positions, as shown in Figure 7, the first downward movement of the handle 62 acts to urge the cam surface 68 into engagement with the lower surface of the plate 30—a. Further movement of the handle forces the shank 71 of the jaw member 70 away from the plate 30—a. This loosens the hook portion 72 sufficiently to release it from its clamped engagement with the upper surface of the flange 51, and drops the right hand end of the plate 30—a away from the flange. The hook portion 50 at the other end of the plate can then be removed from around the other end of the flange 51. Installation of the clamping mechanism will, of course, be the reverse of its removal. The mechanism remains connected to the plate 30—a at all times due to the presence of the pin 66.

It is contemplated, when so desired, to arrange the wheel mounting mechanism in such a manner that the axles 18 are fixedly positioned in the wheels, and are adapted to rotate in usual bearings. In such an embodiment, the plates 30 or 30—a would be equipped with the bearings.

Obviously the invention is susceptible of embodiment in forms other than those shown and described herein, and I therefore do not wish to confine myself to specific form, other than I am limited by the scope of the appended claims.

I claim:

1. Surface rolling apparatus including: a vehicle body; a transverse row consisting of four or more spaced depending legs rigidly carried beneath both ends of the body; a vehicle wheel in each space between adjacent legs; a short axle for each wheel, each axle extending only partially across the lower end of adjacent legs, and being constantly aligned axially; and individual means for removably anchoring each end of each axle to the lower surface of one of said legs.

2. Surface rolling apparatus including: a vehicle body; a transverse row consisting of four or more spaced depending legs rigidly carried beneath both ends of the body; a vehicle wheel in each space between adjacent legs; each axle extending only partially across the lower ends of the adjacent legs, and being constantly aligned axially; a plate beneath each end of each axle; and means for removably attaching each plate to the lower surface of one of the legs.

3. In a vehicle wheel mounting mechanism, the combination with two spaced depending legs carried by the vehicle, each leg having oppositely disposed outwardly extending flanges at their lower ends; a wheel between the legs; and an axle upon which the wheel is rotatably mounted, each end of said axle extending partially across the lower ends of said legs, of means for anchoring each end of said axle to one of said legs, including: a plate having a hook at one end engaged over the edge of one of said flanges, and having a central portion for nesting said axle; and a lever actuated clamping jaw engaging the other flange and the free end of the plate for holding the two in close proximity.

4. In a vehicle wheel mounting mechanism, the combination with two spaced depending legs carried by the vehicle, each leg having oppositely disposed outwardly extending flanges at their lower ends; a wheel between the legs; and an axle upon which the wheel is rotatably mounted, each end of said axle extending partially across the lower ends of said legs, of means for anchoring each end of said axle to one of said legs, including: a plate having a hook at one end engaged over the edge of one of said flanges, and having a central portion for nesting said axle; a lever arm pivotally connected at one end to the nether surface of said plate; a clamping jaw having a shank end pivotally connected to the lever arm intermediate its end, said jaw having a hook end engaging the other flange and the free end of the plate, for holding the two in close proximity when the free end of the lever arm is moved upwardly into contact with the plate.

5. In a vehicle wheel mounting mechanism, the combination with two spaced depending legs carried by the vehicle, each leg having oppositely disposed outwardly extending flanges at their lower ends; a wheel between the legs; and an axle upon which the wheel is rotatably mounted, of means for anchoring each end of said axle to one of said legs, including: a plate having a hook at one end engaged over the edge of one of said flanges, and having a central portion for nesting said axle; and a lever actuated clamping jaw engaging the other flange and the free end of the plate for holding the two in close proximity.

6. A wheel assembly for surface rollers, including: a frame; a row of four or more spaced legs depending from said frame; a wheel in each space between adjacent legs of said row; an individual axle for each wheel extending between the lower ends of said adjacent legs; and a pair of removable bearing plates for each axle, said plates each attached to the lower surface of one of said legs for holding one end of an axle beneath the leg.

7. A wheel assembly for surface rollers, including: a frame; a row of four or more spaced legs depending from said frame; a downwardly facing surface upon each leg; a wheel in each space between adjacent legs of said roller; an individual axle for each wheel; said axles extending between two of said leg surfaces; and removable detents for mounting the axles rigidly to the respective surfaces, whereby removal of one pair of the detents permits the dropping of one axle and its wheel for accomplishing removal of the wheel from between said adjacent legs.

ROBERT R. TWAY.